United States Patent
Kobayashi

(10) Patent No.: US 8,211,561 B2
(45) Date of Patent: Jul. 3, 2012

(54) WINDING TYPE BATTERY AND METHOD FOR MANUFACTURING THE WINDING TYPE BATTERY

(75) Inventor: Keiichiro Kobayashi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 12/934,725

(22) PCT Filed: Mar. 30, 2009

(86) PCT No.: PCT/JP2009/056434
§ 371 (c)(1),
(2), (4) Date: Sep. 27, 2010

(87) PCT Pub. No.: WO2009/123081
PCT Pub. Date: Oct. 8, 2009

(65) Prior Publication Data
US 2011/0020679 A1   Jan. 27, 2011

(30) Foreign Application Priority Data
Apr. 4, 2008 (JP) ................................. 2008-098373

(51) Int. Cl.
*H01M 10/04* (2006.01)
*H01M 6/10* (2006.01)
*H01M 2/14* (2006.01)
(52) U.S. Cl. .......... 429/94; 429/144; 429/247; 29/623.1
(58) Field of Classification Search ........................ None
See application file for complete search history.

(56) References Cited

FOREIGN PATENT DOCUMENTS

| | | |
|---|---|---|
| JP | 55-42613 | 10/1980 |
| JP | 4-332481 | 11/1992 |
| JP | 5-225998 | 9/1993 |
| JP | 7-335249 | 12/1995 |
| JP | 8-250155 | 9/1996 |
| JP | 11-204130 | 7/1999 |
| JP | 2001-283894 | 10/2001 |
| JP | 2003-92148 | 3/2003 |
| JP | 2003-229177 | 8/2003 |
| JP | 2003-297326 | 10/2003 |

OTHER PUBLICATIONS

Machine translation of JP 7-335249, Dec. 1995.*
International Search Report in International Application No. PCT/JP2009/056434; Mailing Date: Jul. 7, 2009.

* cited by examiner

*Primary Examiner* — Jonathan Crepeau
(74) *Attorney, Agent, or Firm* — Finnegan, Henderson, Farabow, Garrett & Dunner, LLP

(57) ABSTRACT

Disclosed is a winding type battery comprising a center pin, and a wound power generation element formed by interposing a first separator in one interspace between a positive electrode plate and a negative electrode plate, interposing a second separator in another interspace between the positive electrode plate and the negative electrode plate, fixing the first and second separators to the center pin and then winding in one direction. Also disclosed is a method for manufacturing a winding type battery. A winding type battery belongs to batteries demand of which is increasing recently. A center pin of an inventive winding type battery is provided with an inside clamp portion and an outside clamp portion, portions to be clamped of first and second separators are clamped between the inside and outside clamp portions while being extended in the forward winding direction, and then the first separator is touched along the outside clamp portion.

7 Claims, 12 Drawing Sheets

WINDING TYPE BATTERY AND METHOD FOR MANUFACTURING THE WINDING TYPE BATTERY

CROSS-REFERENCE TO RELATED APPLICATIONS

This is a national phase application filed under 35 U.S.C. 371 of PCT/JP2009/056434 filed on Mar. 30, 2009, which claims the benefit of priority from the prior Japanese Patent Application No. 2008-098373 filed on Apr. 4, 2008, the entire contents of all of which are incorporated herein by reference.

TECHNICAL FIELD

The present invention relates to a winding type battery having a center pin and a method for manufacturing this winding type battery.

BACKGROUND ART

With the recent popularization of portable electronic devices such as cellular phones, notebook-size personal computers, and video camcorders and also vehicles such as hybrid electric vehicles, there is an increasing demand for batteries to be used as drive power sources of the above devices and vehicles.

Those batteries include a winding type battery produced by winding a positive electrode plate and a negative electrode plate while interposing a separator therebetween. For instance, Patent Literature 1 discloses a battery (a winding type battery) provided with a spiral type electrode body (a winding power generation element) that includes a center pin in which a cotter pin supporting one end of a separator is inserted, the separator being extended from a slit of the center pin, and a strip-shaped positive electrode (a positive electrode plate) and a strip-shaped a negative electrode (a negative electrode plate) being wound around the center pin while interposing the separator therebetween.

In this winding type battery disclosed in Patent Literature 1, the separator extending from the slit of the center pin in a radially outward direction is bent at almost right angle to extend along a peripheral surface of the center pin and then wound around the center pin.

CITATION LIST

Patent Literature

Patent Literature 1: JP7(1995)-335249A

SUMMARY OF INVENTION

Technical Problem

However, the battery has a tendency that the position of the separator may slightly vary due to expansion and contraction of the volume of the winding power generation element in association with charge and discharge thereof. In the winding type battery disclosed in Patent Literature 1, repetition of such variation may cause fatigue cracks in a bent portion of the separator, thus resulting in breakage or break-off of the separator.

The present invention has been made in view of the circumstances to solve the above problems and has a purpose to provide a winding type battery capable of preventing breakage of a separator due to bending and a method for manufacturing such winding type battery.

Solution to Problem

One aspect of the invention provides a winding type battery comprising: a center pin having a shape that extends along an axial line; and a wound power generation element in which a strip-shaped positive electrode plate and a strip-shaped negative electrode plate are wound in an overlapping state so that a strip-shaped first separator longer than the positive electrode plate and the negative electrode plate is interposed in one interspace between the positive electrode plate and the negative electrode plate and a strip-shaped second separator longer than the positive electrode plate and the negative electrode plate is interposed in another interspace between the positive electrode plate and the negative electrode plate, at least one of the first separator and the second separator being fixed to the center pin and wound from a start end side around the center pin in one direction, wherein when a circumferential direction around the axial line, in which winding of the wound power generation element advances, is referred to as a forward winding direction, at least one of the first separator and the second separator has a clamped portion clamped by the center pin, the center pin includes; an inside clamp portion; and a plate-like outside clamp portion located radially outside of the inside clamp portion relative to the axial line; the clamped portion is clamped between an outer peripheral surface of the inside clamp portion and an inner peripheral surface of the outside clamp portion while the clamped portion is extended in the forward winding direction along the inner peripheral surface of the outside clamp portion, and one of the first separator and the second separator is extended along in contact with the outer peripheral surface of the outside clamp portion.

In this winding type battery, the clamped portion of at least one of the first separator and the second separator is clamped between the outer peripheral surface of the inside clamp portion and the inner peripheral surface of the outside clamp portion of the center pin to extend along the inner peripheral surface of the outside clamp portion. In addition, the clamped portion extends in the forward winding direction in which winding of the winding power generation element advances. Furthermore, the first separator, the second separator, the positive electrode plate, and the negative electrode plate are wound around the center pin in one direction (the forward winding direction).

Accordingly, in either one of the first separator and the second separator, which includes the clamped portion, the clamped portion also extends in the forward winding direction, extends from between the inside clamp portion and the outside clamp portion of the center pin and is wound in the forward winding direction. In other words, the separator is wound around the center pin without being bent at or near this clamped portion. Thus, a winding type battery can be provided in which the separator is prevented from breaking by bending at or near the clamped portion.

Since the clamped portion is clamped by the center pin, the separator including this clamped portion can be fixed to the center pin without use of for example adhesive agent, adhesive tape, etc.

Furthermore, for example, a step by the thickness of the adhesive agent and the adhesive tape does not occur. Thus, wrinkles resulting from such step do not occur in the separator and others.

In the aforementioned winding type battery, either one of the first separator and the second separator both being wound in the forward winding direction contacts along the outer peripheral surface of the outside clamp portion of the center pin.

Accordingly, the inner peripheral surface and the outer peripheral surface of the outside clamp portion of the center pin are made contact with the separators advancing in the same direction toward the rear ends. At the tail end of this outside clamp portion in the forward winding direction, the separators are overlapped each other at an interval corresponding to the thickness of the tail end of the outside clamp portion in the radial direction of the axial line. Thus, a winding type battery can be configured such that the two separators, the positive electrode plate, and the negative electrode plate are wound around the center pin without forming any large step at the tail end of the outside clamp portion.

As above, the separators, the positive electrode plate, and the negative electrode plate can be wound substantially along the outer peripheral shape of the center pin. Even when repetition of charge and discharge of this winding type battery causes repeated variations of the volumes of the positive electrode plate and the negative electrode plate, the separators and others can be prevented from warping due to the step.

The outside clamp portion may be configured to have a uniform thickness in the forward winding direction but it is preferably formed in a tapered shape having a gradually thinner thickness forward in the forward winding direction.

If only at least one of the first separator and the second separator is clamped, that is, has the clamped portion, the start end of the separator(s) can be fixed to the center pin to start winding. Accordingly, for example, in the case where they are wound with the first separator being placed inside, there are conceivable cases; one is to clamp only the first separator (where only the first separator includes the clamped portion), another is to clamp only the second separator (where only the second separator includes the clamped portion), and further another is to clamp the first and second separators (where the first separator and the second separator include the clamped portions).

Of the above cases, the case where both the first separator and the second separator are clamped is more preferable. This is because the clamped portions of two separators are clamped respectively and therefore a winding type battery can be produced by reliably winding those two separators, the positive electrode plate, and the negative electrode plate.

As an alternative, the first separator and the second separator may be provided as separate members. Another alternative is to fold a single strip-shaped separator into two so that one side of a fold line is used as the first separator and the other side is used as the second separator. In this case, a fold line side is preferably placed on a start end side.

The shape of the outer peripheral surface of the center pin may include for example a circular cylindrical shape and a polygonal tube shape such as a rectangular tube shape and a hexagonal tube shape. At that time, the winding power generation element is accordingly wound into for example a cylindrical shape or a polygonal tube shape such as a rectangular tube shape and a hexagonal tube shape.

In the above winding type battery, preferably, the outside clamp portion of the center pin is designed so that at least an end portion located forward in the forward winding direction has a tapered shape that is gradually thinner in thickness forward in the forward winding direction.

In the above winding type battery, the outside clamp portion is designed such that at least its end portion in the forward winding direction has a tapered shape. Accordingly, this outside clamp portion has a thin thickness at the tail end in the forward winding direction. As described above, the inner peripheral surface and the outer peripheral surface of this outside clamp portion contact with the separators. At the tail end of this outside clamp portion, the separators are overlapped each other at an interval corresponding to the thickness of the outside clamp portion at the tail end. Consequently, the above configuration can further reduce a step occurring between the separators or substantially eliminate the step in such portion. Thus, a winding type battery can be provided in which the separators and others are prevented from warping by the existence of such a gap.

In the above winding type battery, preferably, the center pin is elastically deformable in a direction perpendicular to the axial line.

In the above winding type battery, the center pin is elastically deformable in a direction perpendicular to the center pin. Even when the volume of the winding power generation element expands and contracts during charge and discharge, the center pin can be elastically deformed along the separator that contacts with the center pin. To be concrete, when the volume of the winding power generation element expands due to charge, the center pin can be elastically deformed so as to reduce its diameter. To the contrary, when the volume of the winding power generation element contracts, the center pin can be elastically deformed so as to increase its diameter. According to expansion and contraction of the winding power generation element, the diameter of the center pin can also be decreased and increased. This can reduce the stress caused by expansion of the winding power generation element and others to be exerted on the separator, the positive electrode plate, and the negative electrode plate.

In the above winding type battery, preferably, the center pin is constituted of a plate material wound in a spiral shape beyond one turn about the axial line.

In the above winding battery, the center pin has the aforementioned spiral shape. Thus, the center pin can be elastically deformed along the separator contacting therewith in the direction perpendicular to the axial line. Specifically, according to expansion and contraction of the winding power generation element, the diameter of the center pin can also be decrease and increase. This can reduce the stress caused by expansion of the winding power generation element and others to be exerted on the separator, the positive electrode plate, and the negative electrode plate.

Furthermore, another aspect is to provide a method for manufacturing a winding type battery comprising: a center pin having a shape that extends along an axial line; and a wound power generation element in which a strip-shaped positive electrode plate and a strip-shaped negative electrode plate are wound in an overlapping state so that a strip-shaped first separator longer than the positive electrode plate and the negative electrode plate is interposed in one interspace between the positive electrode plate and the negative electrode plate and a strip-shaped second separator longer than the positive electrode plate and the negative electrode plate is interposed in another interspace between the positive electrode plate and the negative electrode plate, at least one of the first separator and the second separator being fixed to the center pin and wound from a start end side around the center pin in one direction, wherein when a circumferential direction around the axial line, in which winding of the wound power generation element advances, is referred to as a forward winding direction, the center pin includes an inside clamp portion; and a plate-like outside clamp portion located radially outward of the axial line than the inside clamp portion; the method comprises: a clamping step of clamping a clamped portion of at least one of the first separator and the second separator between the outer peripheral surface of the inside clamp portion and the inner peripheral surface of the outside clamp portion of the center pin and along the inner peripheral surface of the outside clamp portion while maintaining a shape extending in the forward winding direction; and a winding step of winding the first separator, the second separator, the positive electrode plate, and the negative electrode plate around the center pin so that one of the first separator and the second separator wound in the forward winding direction is in contact with the outer peripheral surface of the outside clamp portion of the center pin.

In the above method for manufacturing the winding type battery, in the clamping step, the clamped portion is placed to take such a shape that the clamped portion is extended in the winding forward direction in which winding of the winding power generation element advances, which is one of circumferential directions around the axial line. Simultaneously, the clamped portion of at least one of the first separator and the second separator is clamped between the outer peripheral surface of the inside clamp portion and the inner peripheral surface of the outside clamp portion of the center pin. Then, in the winding step, the two separators, the positive electrode plate, and the negative electrode plate are wound around the center pin so that either one of the first separator and the second separator wound in the forward winding direction extends along in contact with the outer peripheral surface of the outside clamp portion.

Consequently, the first separator, the second separator, and others can be wound around the center pin while the separators are fixedly clamped by the center pin without being bent at or near the clamped portion. This method can therefore manufacture the winding type battery in which the separators are prevented from breaking at or near the clamped portion.

Furthermore, in the above method for manufacturing the winding type battery, preferably, the outside clamp portion of the center pin is designed so that at least an end portion located forward in the forward winding direction has a tapered shape that is gradually thinner in thickness forward in the forward winding direction.

In the above manufacturing method of the winding type battery, the outside clamp portion is formed such that at least the end portion in the forward winding direction has a tapered shape. Thus, the outside clamp portion is thinner in thickness at the terminal end thereof in the forward winding direction. As described above, the separators contact with the inner peripheral surface and the outer peripheral surface of the outside clamp portion. At this tail end of the outside clamp portion, the separators are overlapped each other at an interval corresponding to the plate thickness. With the above configuration, the step that may occur between the separators in that portion can be made smaller or substantially eliminated. This method can therefore manufacture the winding type battery in which the separator and others are prevented from warping by the existence of the gap.

Figure 1:
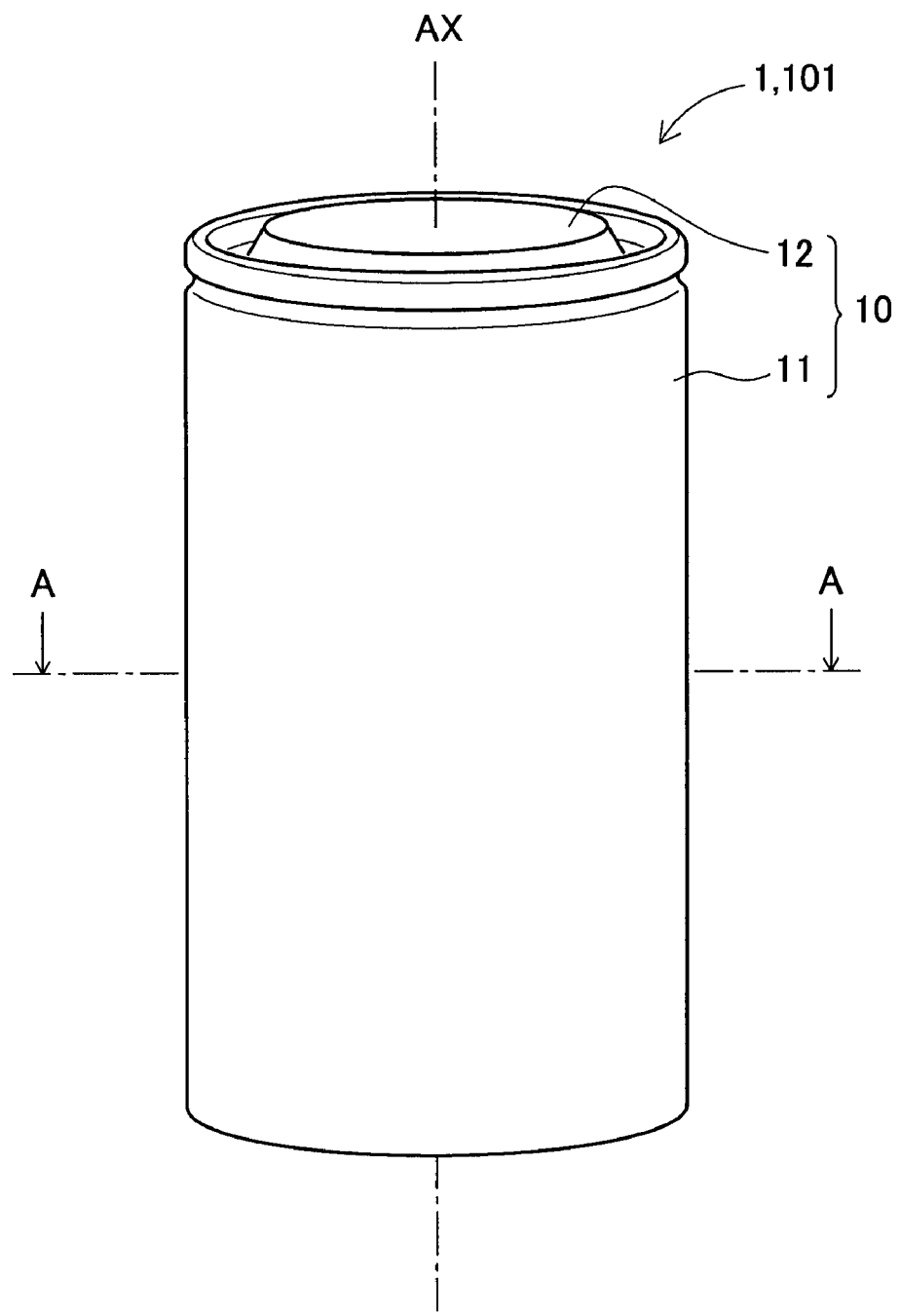
FIG. 1 is a perspective view of a battery in a first embodiment and a first modified example.

REFERENCE SIGNS LIST 1, 101, 201, 301, 401 Battery (Winding type battery)
20, 420 Center pin
21, 421 Inside clamp portion
121 Body-side clamp portion (Inside clamp portion)
23, 123, 423 Outer peripheral surface (Outer peripheral surface of inside clamp portion)
25, 425 Outside clamp portion
125 Extended portion (Outside clamp portion)
25P, 125P End portion
26, 126, 426 Inner peripheral surface (Inner peripheral surface of outside clamp portion)
27, 127, 427 Outer peripheral surface (Outer peripheral surface of outside clamp portion)
30, 430 Power generation element (Winding power generation element)
31, 231, 331 First separator
31E Rear end (of First separator)
32, 132, 232 First clamped portion (Clamped portion)
35, 235, 335 Second separator
35E Rear end (of Second separator)
36, 136, 336 Second clamped portion (Clamped portion)
38 Positive electrode plate
39 Negative electrode plate
AX, BX Axial line
FW Forward winding direction

DESCRIPTION OF EMBODIMENTS

First Embodiment

A detailed description of a first embodiment will now be given referring to the accompanying drawings.

Figure 2:
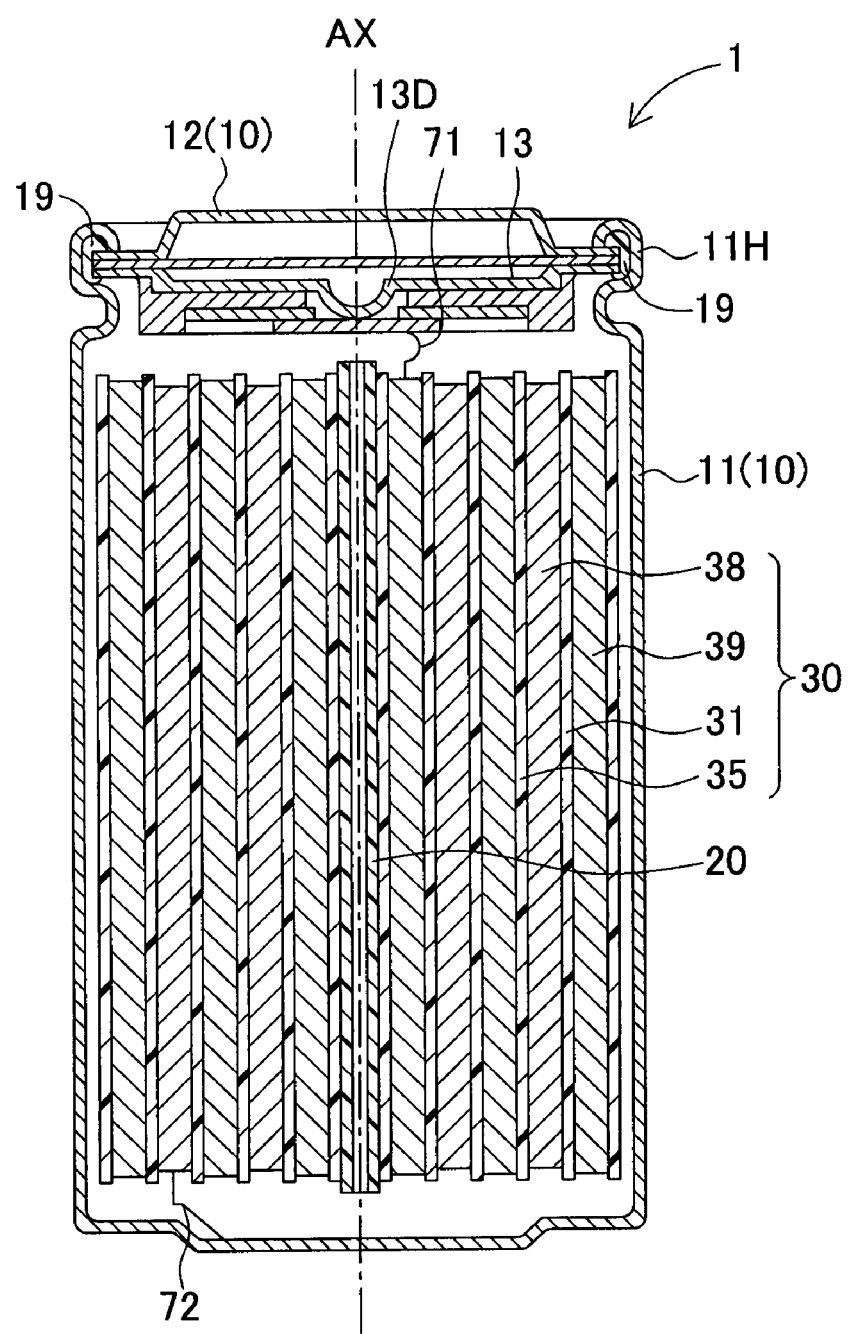
FIG. 2 is a sectional view (an axial line AX in FIG. 1) in the first embodiment.

A battery 1 in the first embodiment includes a center pin 20, a power generation element 30, and a battery case 10 and is a cylindrical lithium ion secondary battery having an axial line (see FIGS. 1 and 2).

The battery case 10 has a battery case body 11 made of metal having a bottom-closed cylindrical shape and a closing lid 12 having a circular disk shape as shown in FIGS. 1 and 2. The battery case body 11 contains a power generation element 30 produced by winding a strip-shaped positive electrode plate 38 and a strip-shaped negative electrode plate 39 while interposing a first separator 31 and a second separator 35 therebetween (see FIGS. 2 and 3).

The closing lid 12 made of metal and a safety valve mechanism 13 placed inside the lid 12 are fixed by caulking in an opening portion 11H of the battery case body 11 through a gasket 19 made of insulating resin (see FIG. 2). Thus, the battery case body 11 is sealingly closed. The safety valve mechanism 13 is configured to cut off an electrical connection between the closing lid 12 and the power generation element 30 by causing a disk plate 13D to turn upward when the internal pressure of the battery 1 becomes a predetermined value or higher due to internal short circuit of the battery 1, exterior heat, or other reasons.

The following explanation is given to the power generation element 30. This power generation element 30 is wound around the center pin 20 extending along the axial line AX (see FIGS. 2, 3, and 4). Specifically, the strip-shaped positive electrode plate 38 and the strip-shaped negative electrode plate 39 are wound in an overlapping manner. In one of interspaces between the positive electrode plate 38 and the negative electrode plate 39, the first separator 31 having a longer stripe shape than the electrode plates 38 and 39 is interposed. In another interspace, the second separator 35 having a longer stripe shape than the electrode plates 38 and 39 is interposed. That is, the first separator 31, the positive electrode plate 38, the second separator 35, and the negative electrode plate 39 are laminated in this order from a side closer to the center pin 20 and they are wound in layers two or more times. The positive electrode plate 38, the negative electrode plate 39, the first separator 31, and the second separator 35 are wound clockwise in one direction around the center pin 20 in FIG. 4. This direction (clockwise) in which winding of the power generation element 30 advances is referred to as a forward winding direction FW.

The positive electrode plate 38 of the power generation element 30 is connected to a positive lead member 71 (see FIG. 2). This positive lead member 71 is welded to the safety valve mechanism 13 and hence the positive electrode plate 38 and the closing lid 12 are electrically connected to each other. On the other hand, the negative electrode plate 39 is connected to a negative lead member 72. This negative lead member 72 is welded to the battery case body 11 and hence the negative electrode plate 39 and the battery case body 11 are electrically connected to each other.

The positive electrode plate 38 is constituted of a positive metal foil (not shown) made of a long-strip-shaped metal foil and a positive active material layer (not shown) carried on each surface of this positive metal foil. The positive active material layer includes a positive active material constituted of $LiCoO_2$, a binding material, and a conductive material.

The negative electrode plate 39 is constituted of a negative metal foil (not shown) made of a long-strip-shaped metal foil and a negative active material layer (not shown) carried on each surface of this negative metal foil. The negative active material layer includes a negative active material constituted of graphite and a binding material.

The first separator 31 and the second separator 35 both being made of polyethylene are formed by folding a signal strip-shaped separator longer than the above positive electrode plate 38 and negative electrode plate 39 into two in a longitudinal direction. Specifically, with respect to a fold line BP along which the separator is folded, an inner side closer to the axial line AX is used as the first separator 31 and the other side is used as the second separator 35 (see FIGS. 3 and 4).

Next, the center pin 20 clamping the first separator 31 and the second separator 35 is explained. The center pin 20 made of insulating resin has a hollow spirally cylindrical shape that extends in a direction along the axial line AX and is wound so that one portion overlaps another portion, that is, wound beyond one turn about the axial line AX, and hence has a spiral cross section in a direction perpendicular to the axial line AX (see FIGS. 4 and 5).

Figure 4:
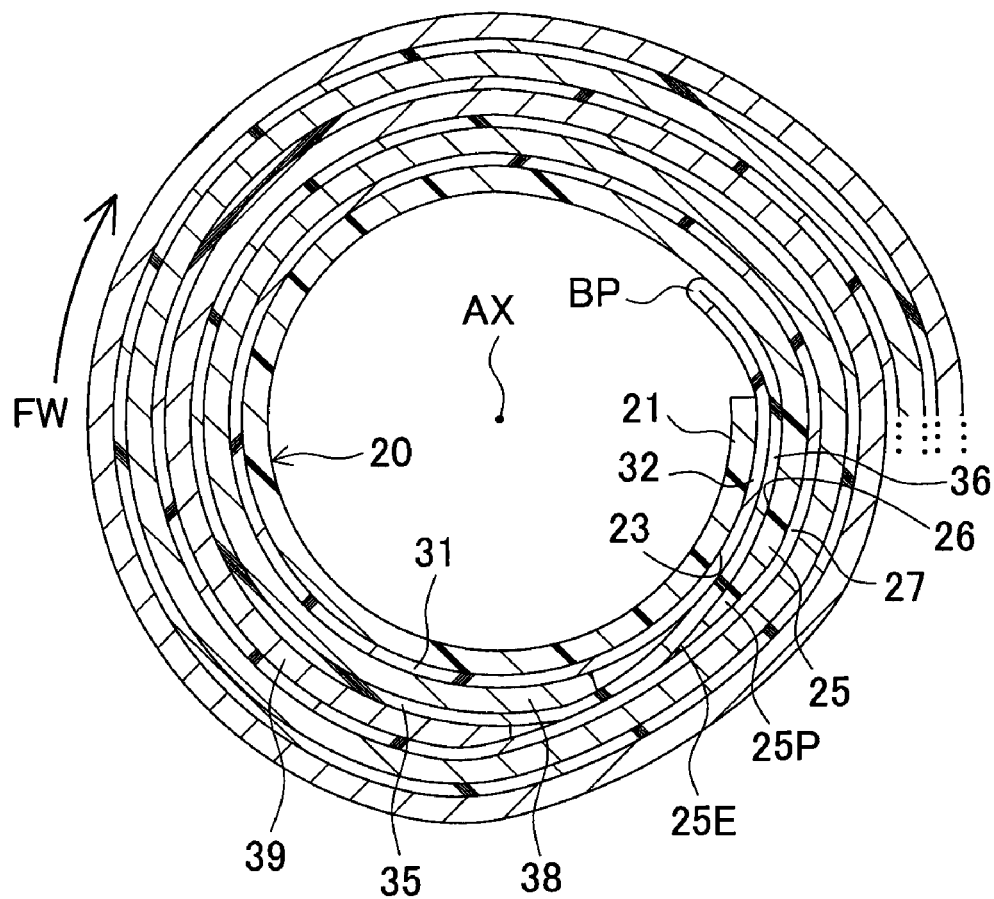
FIG. 4 is an enlarged sectional view of the battery (a part B in FIG. 3) in the first embodiment.
Figure 5:
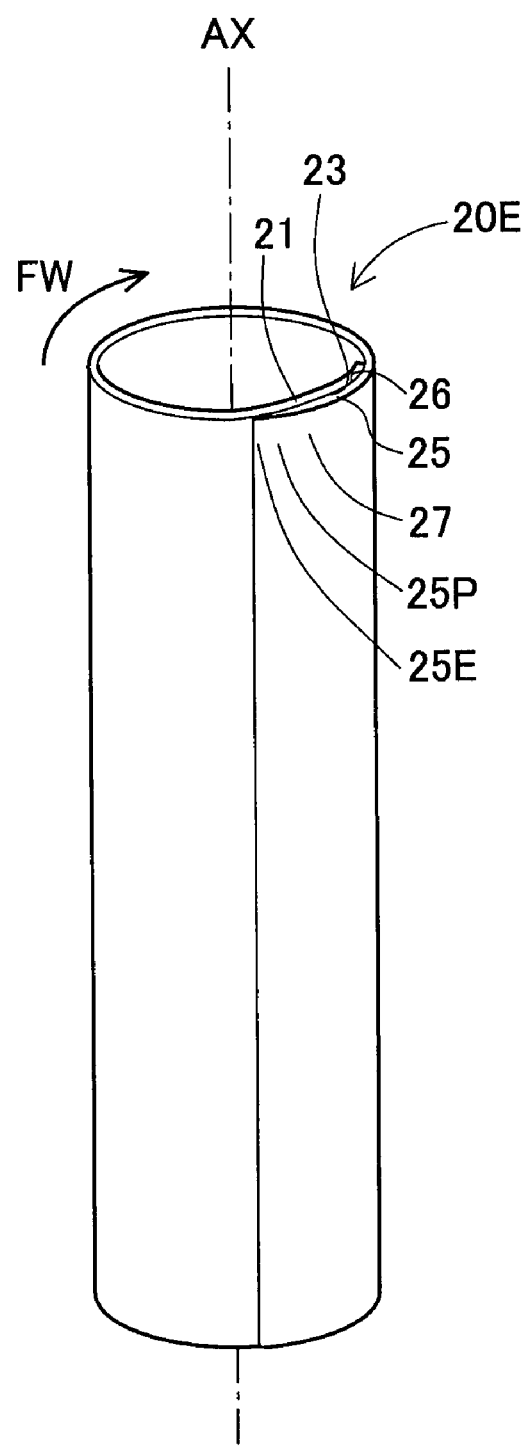
FIG. 5 is an explanatory view of a clamping step in the first embodiment.

This center pin 20 includes an arc-shaped inside clamp portion 21 located relatively inside and an arc-shaped outside clamp portion 25 located radially outside of the inside clamp portion 21 relative to the axial line AX (see FIGS. 4 and 5).

The center pin 20 elastically clamps the first separator 31 and the second separator 35 between the inside clamp portion 21 and the outside clamp portion 25. To be concrete, between an outer peripheral surface 23 of the inside clamp portion 21 facing radially outward of the axial line AX and an inner peripheral surface 26 of the outside clamp portion 25 facing radially inward of the axial line AX, a first clamped portion 32 located on a start end side of the first separator 31 and a second clamped portion 36 located on a start end side of the second separator 35, both portions 32 and 35 being near the fold line BP, are clamped. Accordingly, the battery 1 can be provided in which the above first separator 31 and second separator 35 are fixed to and wound around the center pin 20 and besides the positive electrode plate 38 and the negative electrode plate 39 are reliably wound.

Figure 3:
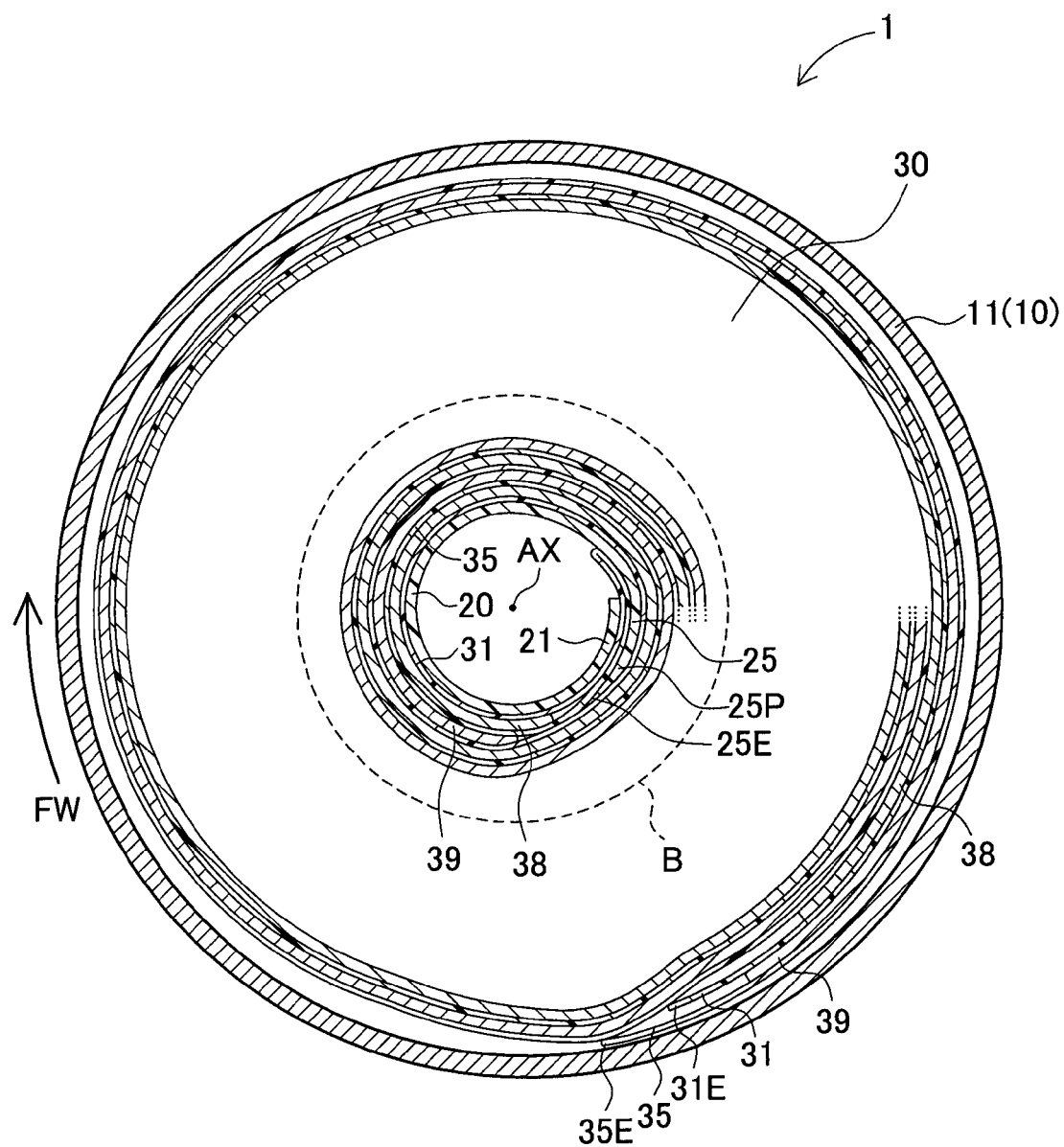
FIG. 3 is a sectional view (a section A-A in FIG. 1) in the first embodiment.

In the center pin 20, the fold line BP corresponding to the start ends of the first separator 31 and the second separator 35 is placed (see FIGS. 3 and 4). The first clamped portion 32 of the first separator 31 extends in the forward winding direction FW (see FIG. 3). The second clamped portion 36 of the second separator 35 also extends in the forward winding direction FW.

The first clamped portion 32 of the first separator 31 and the second clamped portion 36 of the second separator 35 also extend in the forward winding direction FW and from between the inside clamp portion 21 and the outside clamp portion 25 of the center pin 20, and are wound in the forward winding direction FW, as keeping its extending direction. In other words, the first separator 31 and the second separator 35 are wound around the center pin 20 without being bent at or near the first clamped portion 32 and the second clamped portion 36 respectively. Accordingly, the battery 1 can include the first separator 31 and the second separator 35 prevented from breaking by bending at and near the clamped portions 32 and 36.

In addition, both the first clamped portion 32 and the second clamped portion 36 are clamped by the center pin 20. The separator 31 including the first clamped portion 32 and the separator 35 including the second clamped portion 36 can be fixed to the center pin 20 without using for example adhesive agent, adhesive tape, etc.

Furthermore, for example, no step is caused due to the thickness of the adhesive agent or the adhesive tape, so that wrinkles resulting from such step do not occur in the separators 31 and 35 and others.

In the battery 1 of the first embodiment, the first separator 31 wound in the forward winding direction FW contacts with the outer peripheral surface 27 of the outside clamp portion 25 of the center pin 20 along the outer peripheral surface 27 of the outside clamp portion 25.

In other words, the inner peripheral surface 26 of the outside clamp portion 25 of the center pin 20 contacts with the second separator 35 and the outer peripheral surface 27 of the outside clamp portion 25 of the center pin 20 contacts with the first separator 31. The first separator 31 and the second separator 35 extend to a first rear end 31E and a second rear end 35E respectively in the same direction as shown in FIG. 3. Thus, at a terminal or tail end 25E of the outside clamp portion 25 in the forward winding direction FW, the first separator 31 is overlapped on the second separator 35 at an interval in a radial direction relative to the axial line AX by the thickness of the outside clamp portion 25 at the tail end 25E. Accordingly, the battery 1 can be provided in which two separators (the first separator 31 and the second separator 35), the positive electrode plate 38, and the negative electrode plate 39 are wound around the center pin 20 without forming a large step in the above area.

As above, the separators 31 and 35, the positive electrode plate 38, and the negative electrode plate 39 can be wound substantially along the outer periphery of the center pin 20. Thus, even when repetition of charge and discharge of the battery 1 causes repeated variations in the volumes of the positive electrode plate 38 and the negative electrode plate 39, the separators 31 and 35 and others can be prevented from warping due to the step.

The outside clamp portion 25 has a tapered shape having a gradually thinner thickness forward in the forward winding direction FW. To be concrete, the outside clamp portion 25 is designed so that its entire shape including an end portion 25P is gradually thinner toward the tail end 25E in the forward winding direction FW (see FIG. 4).

Accordingly, the outside clamp portion 25 has a thin thickness at the tail end 25E in the forward winding direction FW. As described above, the second separator 35 contacts with the inner peripheral surface 26 of the outside clamp portion 25 and the first separator 31 contacts with the outer peripheral surface 27 respectively. At the tail end 25E of the outside clamp portion 25, the separators 31 and 35 are overlapped at the interval corresponding to the thickness of the outside clamp portion 25 at the tail end 25E. The configuration in the first embodiment can reduce the size of a step that may occur between the separators 31 and 35 or substantially eliminate the step. Consequently, the battery 1 can include the separators 31 and 35 and others prevented from warping by the existence of such a gap.

The center pin 20 has the hollow spirally cylindrical shape around the axial line AX as described above (see FIG. 4). Thus, even when the volume of the power generation element 30 expands and contracts, this center pin 20 can be elastically deformed in association therewith.

When the volume of the power generation element 30 expands, for example, the center pin 20 accordingly tends to wholly decrease its diameter. To the contrary, when the volume of the power generation element 30 contracts, for example, the center pin 20 accordingly tends to wholly increase its diameter.

In the battery 1 in the first embodiment, therefore, the center pin 20 is elastically deformable in the radial direction perpendicular to the axial line AX. Accordingly, even when the volume of the power generation element 30 expands or contracts during charge and discharge, the center pin 20 contacting the first separator 31 can be elastically deformed along the first separator 31 and others.

As above, the diameter of the center pin 20 can be decreased or increased according to expansion or contraction of the power generation element 30. This can reduce the stress to be exerted on the first separator 31, the second separator 35, the positive electrode plate 38, and the negative electrode plate 39 in association with expansion and contraction of the power generation element 30.

A method for manufacturing the battery 1 in the first embodiment will be explained with reference to FIGS. 5 to 8.

FIG. 5 shows a not-yet-clamping center pin 20E before clamping the separators 31 and 35. This center pin 20E made of insulating resin has a spirally cylindrical shape that extends in a direction along an axial line AX and is wound in the forward winding direction FW beyond one turn about the axial line AX. In this center pin 20E, the outer peripheral surface 23 of the inside clamp portion 21 and the inner peripheral surface 26 of the outside clamp portion 25 elastically contact under pressure with each other. Accordingly, the center pin 20E has a configuration capable of elastically clamping the separators 31 and 35 between the inside clamp portion 21 and the outside clamp portion 25.

The outside clamp portion 25 of the not-yet-clamping center pin 20E has a tapered shape having a gradually thinner thickness forward in the forward winding direction FW. To be concrete, the outside clamp portion 25 is designed so that its entire shape including the tail end 25E is gradually thinner in the forward winding direction FW.

Figure 6:
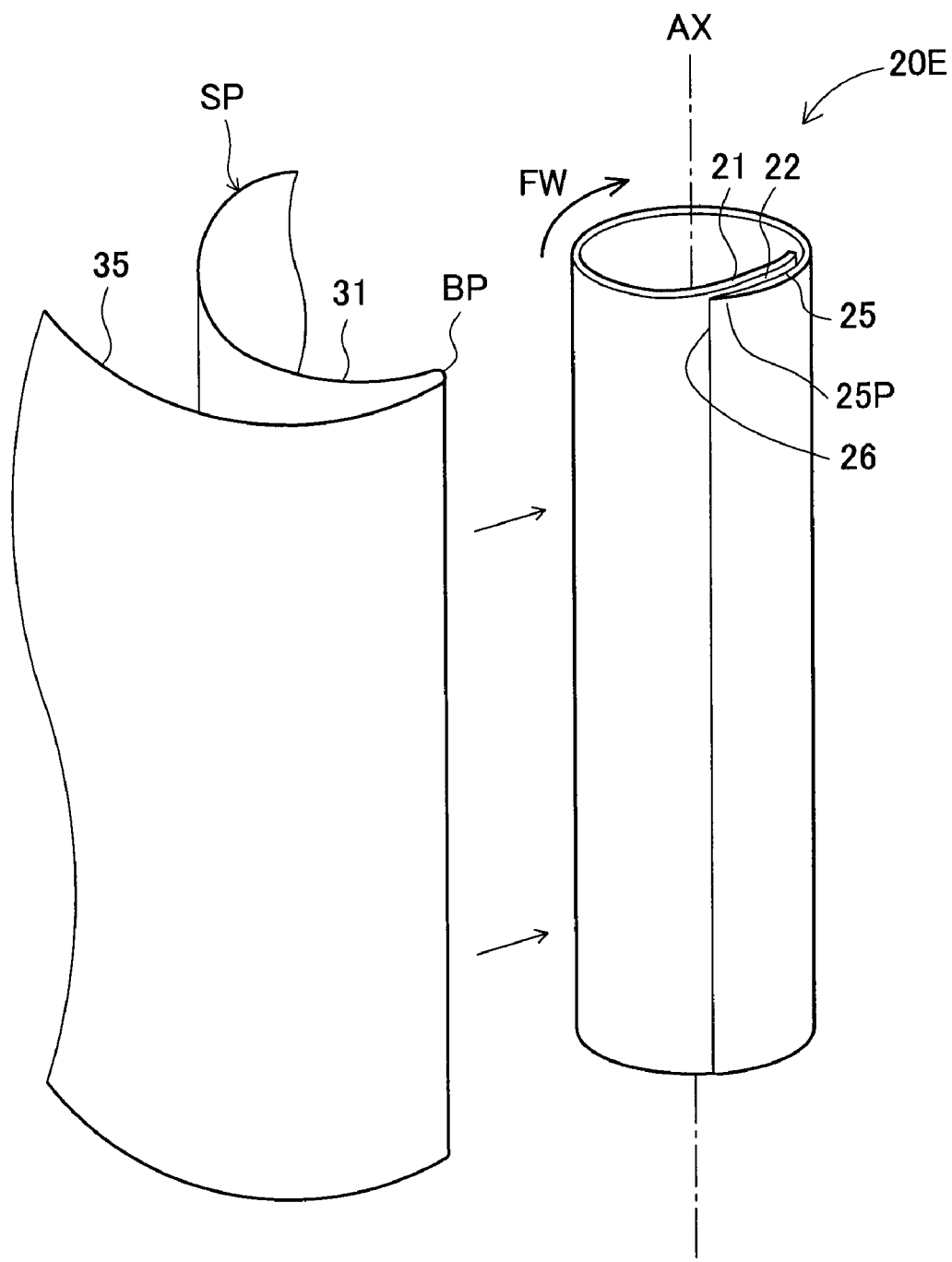
FIG. 6 is an explanatory view of the clamping step in the first embodiment.

A clamping step is first explained with reference to FIG. 6. A long strip-shaped separator SP made of polyethylene is folded into two along a fold line BP extending along the axial line AX, thereby providing the first separator 31 and the second separator 35. Then, the first clamped portion of the first separator 31 and the second clamped portion 36 of the second separator 35 are inserted between the inside clamp portion 21 and the outside clamp portion 25, which are kept separated in advance, of the not-yet-clamping center pin 20E. Between the inside clamp portion 21 and the outside clamp portion 25, accordingly, the first clamped portion 32 of the first separator 31 and the second clamped portion 36 of the second separator 35 are elastically clamped (see FIG. 7).

In the above clamping step, the first clamped portion 32 of the first separator 31 is placed to extend the forward winding direction FW. That is, the first clamped portion 32 is placed to take such a shape that the extending direction of the first clamped portion 32 toward the first rear end 31E of the first separator 31 in the circumferential direction about the axial line AX is the same as the forward winding direction FW in which winding of the power generation element 30 advances. Simultaneously, the second clamped portion 36 of the second separator 35 is extended in the forward winding direction FW. That is, the second clamped portion 36 is placed to take such a shape that the extending direction of the second clamped portion 36 toward the second rear end 35E of the second separator 35 is the same as the forward winding direction FW in which winding of the power generation element 30 advances.

Furthermore, the first clamped portion 32 of the first separator 31 and the second clamped portion 36 of the second separator 35 are clamped by the center pin 20 between the outer peripheral surface 23 of the inside clamp portion 21 and the inner peripheral surface 26 of the outside clamp portion 25.

Figure 7:
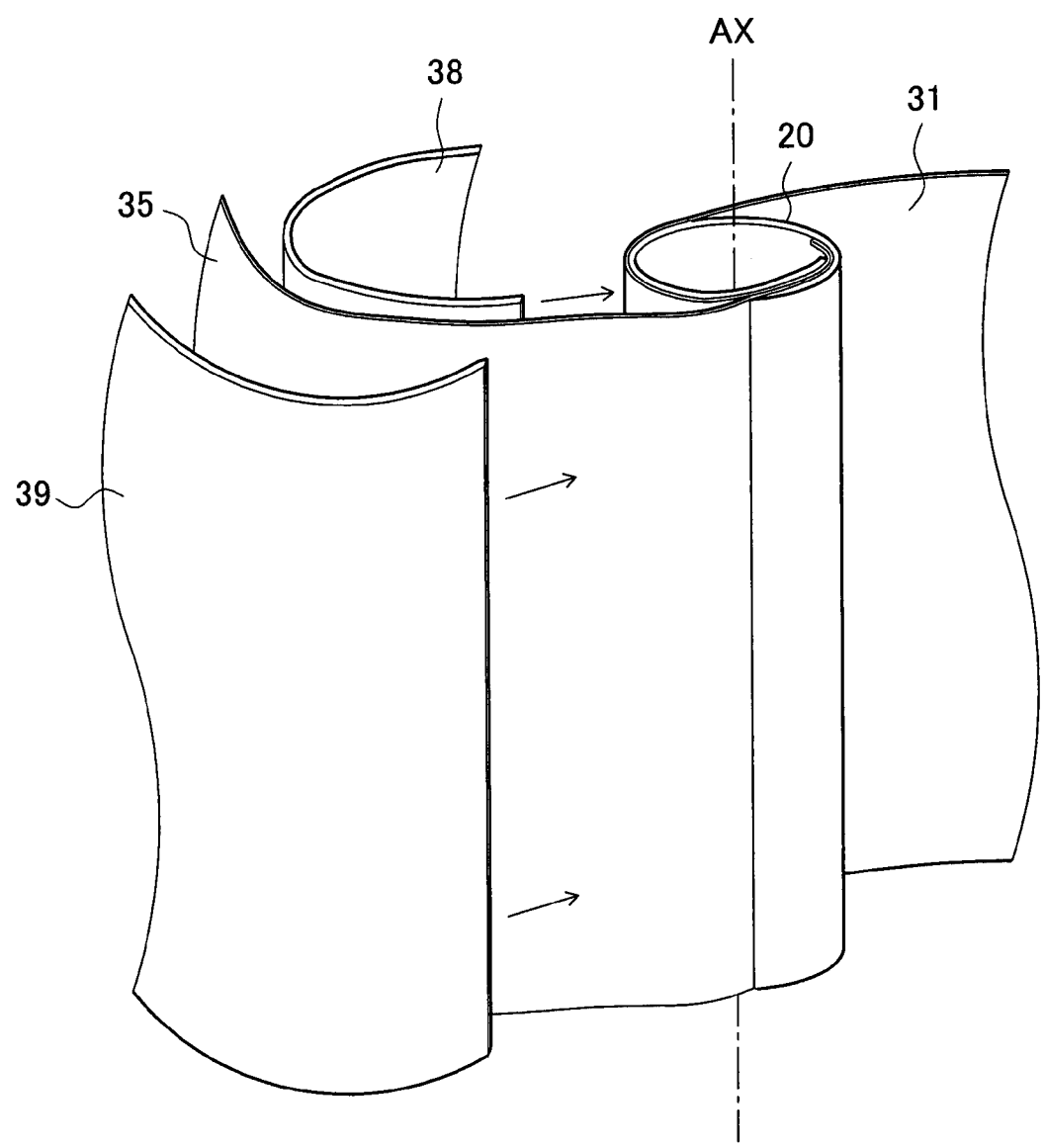
FIG. 7 is an explanatory view of a winding step in the first embodiment.

The winding step is explained below referring to FIGS. 7 and 8. Around the center pin 20 clamping the first separator 31 and the second separator 35, these first separator 31 and second separator 35, the positive electrode plate 38, and the negative electrode plate 39 are wound together in the forward winding direction FW. To be concrete, the positive electrode plate 38 is placed between the first separator 31 and the second separator 35 so as to contact with the radially outer surface of the first separator 31. The negative electrode plate 39 is also placed between the second separator 35 and the first separator 31 so as to contact with the radially outer surface of the second separator 35 (see FIG. 8).

Figure 8A:
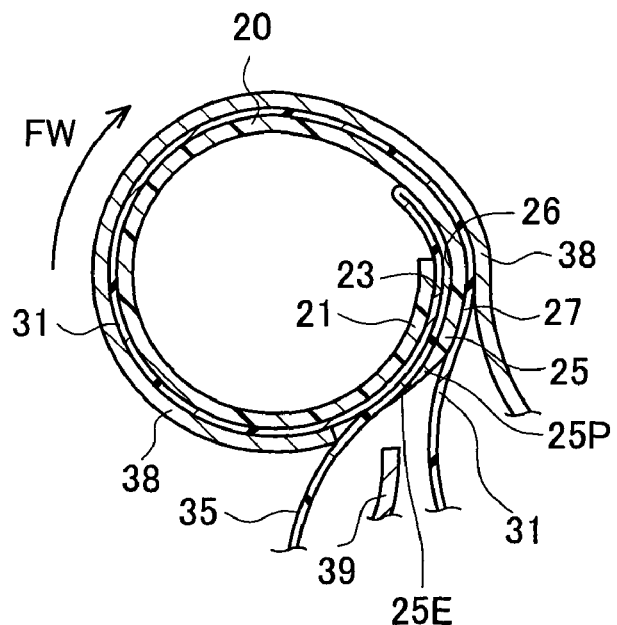
FIG. 8 is an explanatory view of the winding step in the first embodiment.

The first separator 31 is first directly wound about one turn from the outer peripheral surface 23 of the inside clamp portion 21 to the outer peripheral surface 27 of the outside clamp portion 25 (see FIG. 8(a)). Then, the positive electrode plate 38 placed between the first separator 31 and the second separator 35 is wound about three quarters along the first separator 31.

Then, the second separator 35 is wound along the positive electrode plate 38. The negative electrode plate 39 is then wound along the second separator 35 so as to hold the second separator 35 against the positive electrode plate 38.

Figure 8B:
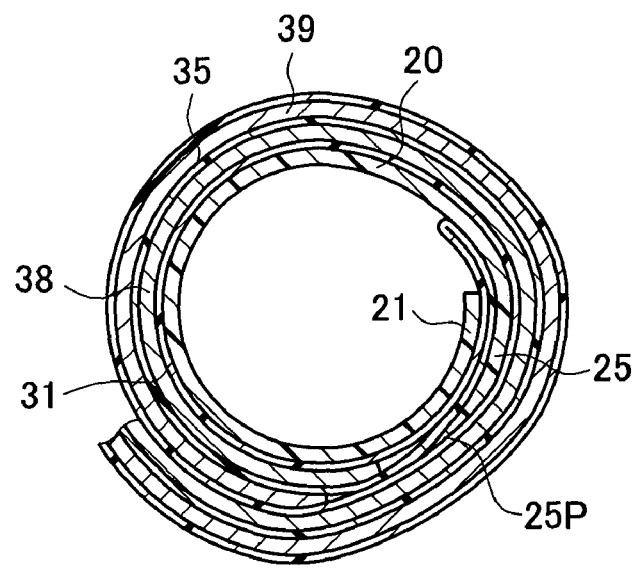

Subsequently, the first separator 31, the positive electrode plate 38, the second separator 35, and the negative electrode plate 39 are further wound (see FIG. 8(b)).

In this way, the positive electrode plate 38 and the negative electrode plate 39 are overlapped by interposing the first separator 31 in one of the interspaces therebetween and the second separator 35 in the other interspace. Thus, the power generation element 30 wound around the center pin 20 is completed.

After the above winding step, the positive lead member 71 is welded to the positive electrode plate 38 of the power generation element 30 and the negative lead member 72 is welded to the negative electrode plate 39 of the power generation element 30. The positive lead member 71 is also welded to the disk plate 13D of the safety valve mechanism 13 and the negative lead member 72 is also welded to the bottom of the battery case body 11. Thereafter, the power generation element 30 is set in the battery case body 11. An electrolyte not shows is poured and then the closing lid 12 and the safety valve mechanism 13 are placed in the opening portion 11H of the battery case body 11 by interposing a gasket 19 therebetween. The opening portion 11H is caulked.

As above, the battery 1 is completed (see FIGS. 1, 2, and 3).

In the method for manufacturing the battery 1 in the first embodiment, the first separator 31 and the second separator 35 can be clamped and fixed by the center pin 20 without bending the first clamped portion 32 of the first separator 31 and the second clamped portion 36 of the second separator 35 and their vicinities. Furthermore, the first separator 31, the second separator 35, and others can be wound around the center pin 20. Accordingly, this method can manufacture the battery 1 in which the first separator 31 and the second separator 35 are prevented from breaking at or near the first clamped portion 31 and the second clamped portion 36.

In the method for manufacturing the battery 1 in the first embodiment, the outside clamp portion 25 is designed so that at least the tail end 25E in the forward winding direction FW has the tapered shape. Accordingly, this outside clamp portion 25 is thinner in thickness at the tail end 25E in the forward winding direction FW.

As described above, the inner peripheral surface 26 and the outer peripheral surface 27 of the outside clamp portion 25 contact with the second separator 35 and the first separator 31 respectively. At the tail end 25E of the outside clamp portion 25, the first separator 31 and the second separator 35 are overlapped at an interval corresponding to the thickness of the tail end 25E of the outside clamp portion 25. The above configuration of the first embodiment can further reduce or substantially eliminate a step that may occur between the first separator 31 and the second separator 35. Consequently, the battery 1 can be manufactured so that the first separator 31 and others are prevented from warping due to the existence of such a gap.

First Modified Example

A battery 101 in a first modified example is explained below referring to FIGS. 1 and 9.

The battery 101 in the first modified example is identical to that in the first embodiment except that an inside clamp portion of a center pin is continuous with an inner portion of the center pin.

The following explanation is therefore given with a focus on the differences from the first embodiment and the details of identical parts are not repeated or are simplified. The identical parts can provide the same operations and effects as those in the first embodiment and also are assigned with the same reference signs as those in the first embodiment.

Figure 9:
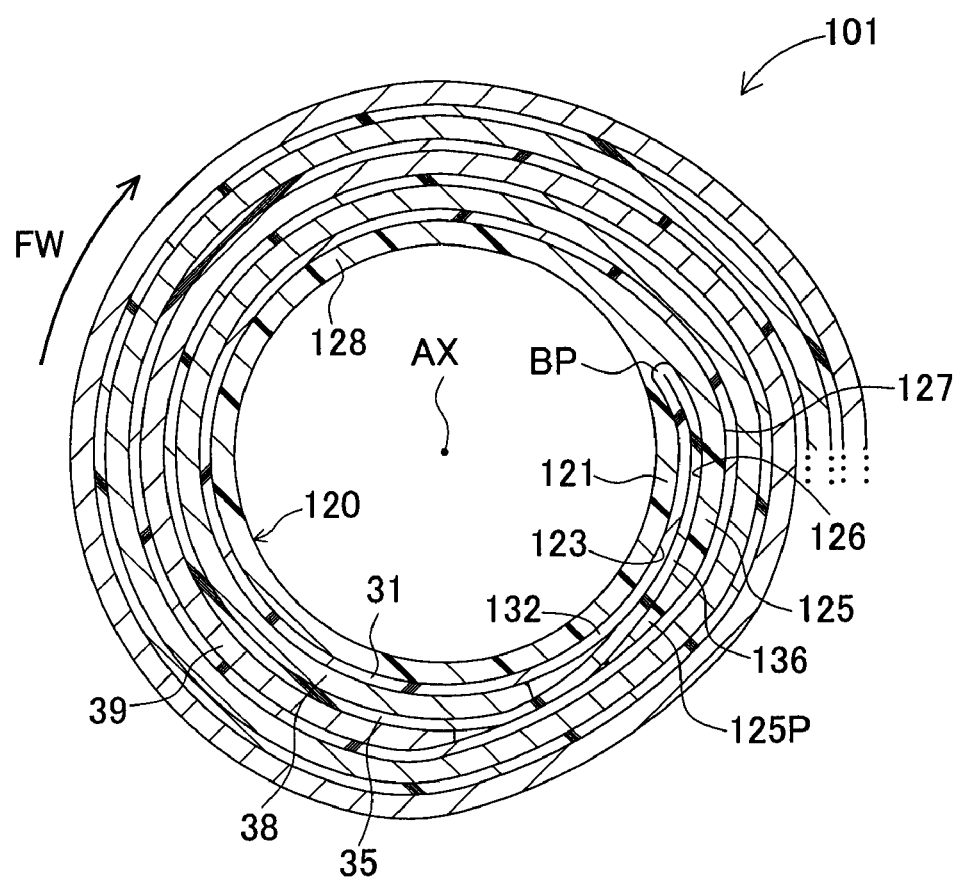
FIG. 9 is an enlarged sectional view of the battery (the section A-A in FIG. 1) in the first modified example.

In the battery 101 in this first modified example, a center pin 120 made of insulating resin includes a hollow cylindrical body part 128 extending along an axial line AX and a plate-like extended portion 125 radially outwardly branching off from the body part 128 and extending along the body part 128 (see FIG. 9). This center pin 120 includes a body-side clamp portion 121 included in the body part 128. Between this clamp portion 121 and the extended portion 125, the first separator 31 and the second separator 35 are elastically clamped and fixed. The extended portion 125 is located radially outward of the axial line AX than the clamp portion 121.

To be concrete, a first clamped portion 132 located on a start end side of the first separator 31 and a second clamped portion 136 located on a start end side of the second separator 35 including a fold line BP are clamped between an outer peripheral surface 123 of the body-side clamp portion 121, which faces radially outward of the axial line AX, and an inner peripheral surface 126 of the extended portion 125, which faces radially inward of the axial line AX. Accordingly, those first separator 31 and the second separator 35 can be fixed by and wound around the center pin 120. The battery 101 can therefore be provided in which the positive electrode plate 38 and the negative electrode plate 39 are wound as well as the above components.

The body-side clamp portion 121 is less likely to move radially inwardly as compared with the inside clamp portion 21 in the first embodiment. In other words, the body-side clamp portion 121 is hard to move radially inwardly by the extended portion 125 elastically clamping the first and second separators 31 and 35 in cooperation with the body-side clamp portion 121. After clamping the separators 31 and 35, the center pin 120 in the first modified example can maintain the cylindrical shape of the body part 128.

As above, the present invention is explained in the first embodiment and the first modified example but is not limited thereto. The present invention may be embodied in other specific forms without departing from the essential characteristics thereof.

For instance, the battery in the first embodiment and the first modified example is a lithium ion battery. As an alternative, the battery may be applied to a secondary battery such as a nickel-metal hydride battery and a primary battery such as an alkaline dry cell and a manganese dry cell.

The single strip-shaped separator SP is folded into two and one side of the fold line BP is used as the first separator and the other side is used as the second separator. Alternatively, the first separator and the second separator may be separate members.

Figure 10:
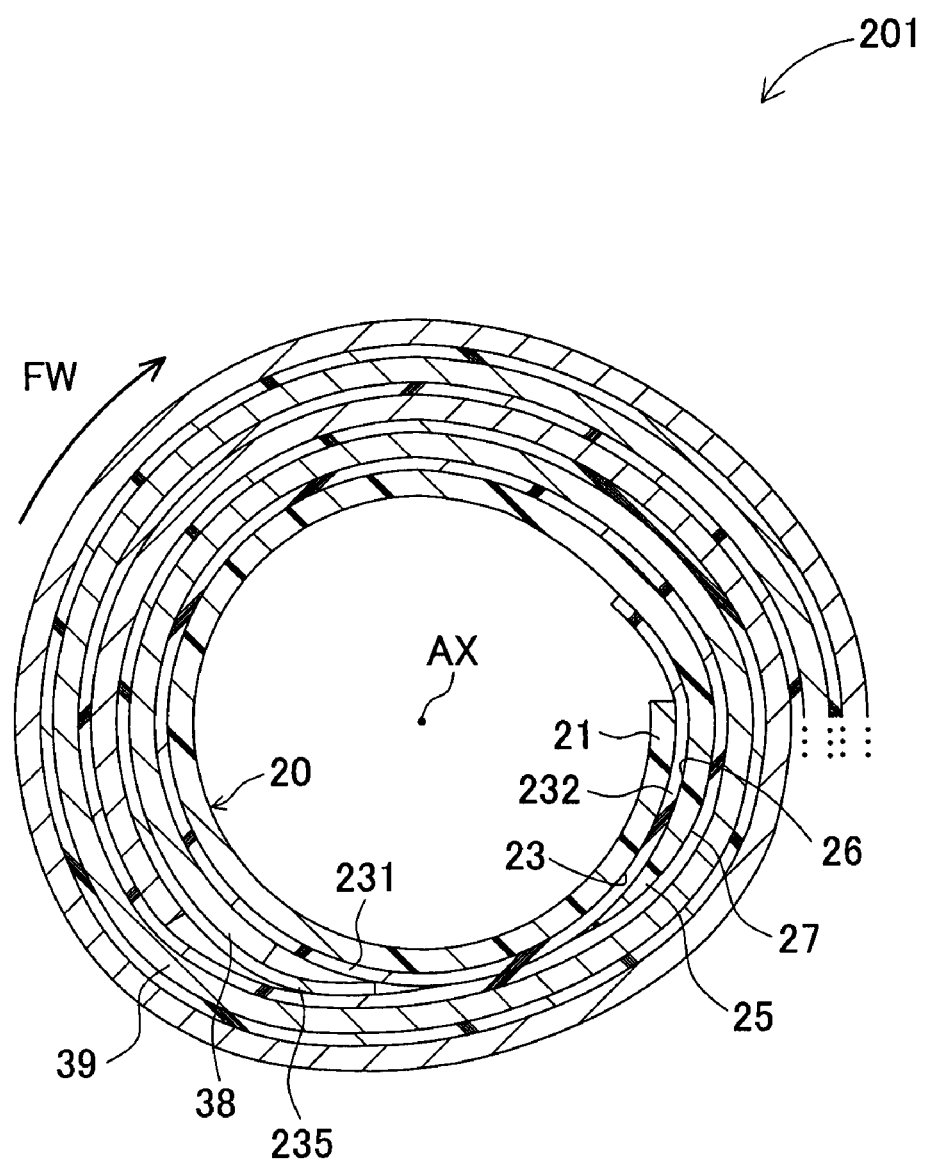
FIG. 10 is an explanatory view of a battery in a modified example.
Figure 11:
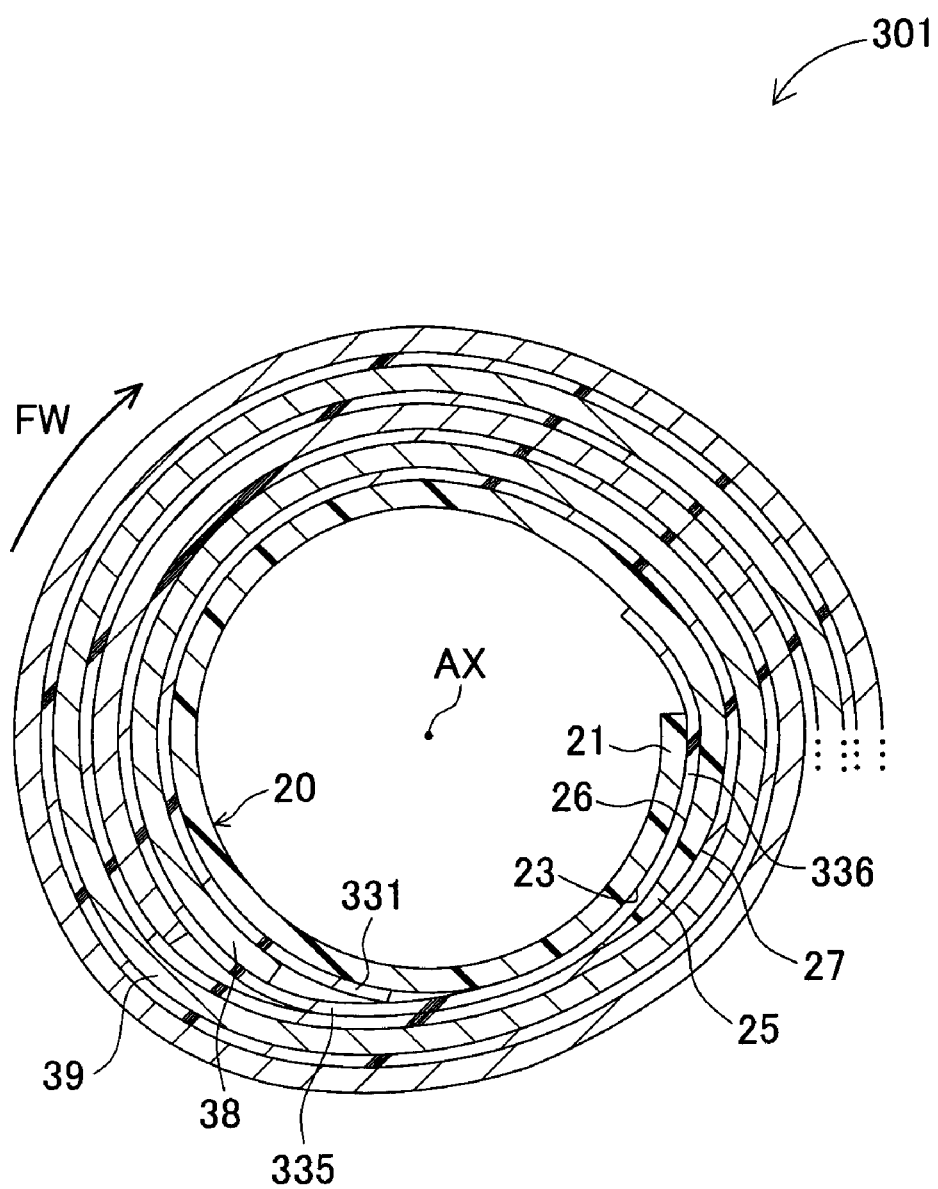
FIG. 11 is an explanatory view of a battery in another modified example.

In the first embodiment and the first modified example, both the first separator and the second separator are clamped by and wound around the center pin. However, it is only necessary to clamp and fix at least one of the first separator and the second separator by the center pin. For example, in the case where a first separator 231 is wound inside (on a close side to the center pin 20), only a first clamped portion 232 of the first separator 231 may be clamped by and fixed to the center pin 20 without clamping a second separator 235 (see FIG. 10). Alternatively, only a second clamped portion 336 of a second separator 335 may be clamped and fixed without clamping a first separator 331 (see FIG. 11).

Figure 12:
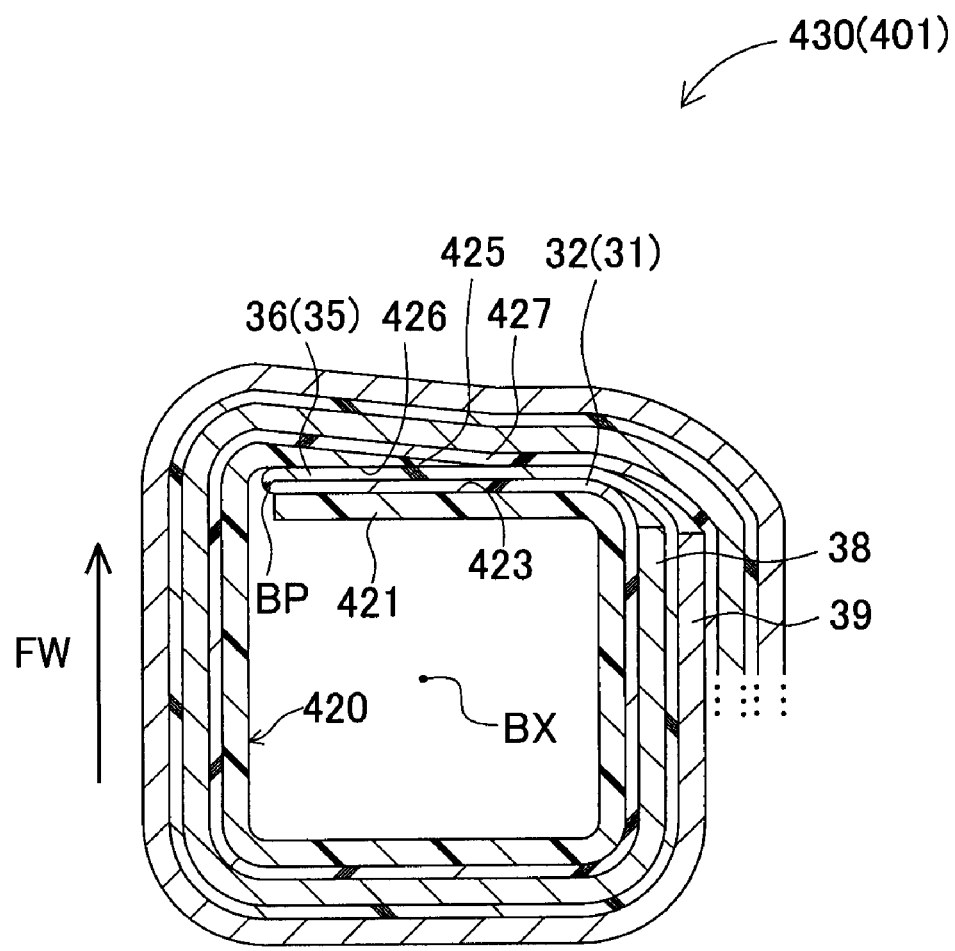
FIG. 12 is an explanatory view of a battery in another modified example.

Furthermore, the shape of the outer peripheral surface of the center pin is cylindrical. As alternatives, polygonal center pins may be adopted, such as a rectangular tubular center pin 420 having an inside clamp portion 421 and an outside clamp portion 425 (see FIG. 12), a hexagonal center pin, or the like.

In such cases, the power generation element is wound along for example the polygonal tubular shape such as a rectangular tubular shape (see FIG. 12), a hexagonal tubular shape, and others.

The invention claimed is:

1. A winding type battery comprising:
    a center pin having a shape that extends along an axial line; and
    a wound power generation element in which a strip-shaped positive electrode plate and a strip-shaped negative electrode plate are wound in an overlapping state so that a strip-shaped first separator longer than the positive electrode plate and the negative electrode plate is interposed in one interspace between the positive electrode plate and the negative electrode plate and a strip-shaped second separator longer than the positive electrode plate and the negative electrode plate is interposed in another interspace between the positive electrode plate and the negative electrode plate,
    at least one of the first separator and the second separator being fixed to the center pin and wound from a start end side around the center pin in one direction,
    wherein when a circumferential direction around the axial line, in which winding of the wound power generation element advances, is referred to as a forward winding direction,
    at least one of the first separator and the second separator has a clamped portion clamped by the center pin,
    the center pin includes
        an inside clamp portion; and
        a plate-like outside clamp portion located radially outside of the inside clamp portion relative to the axial line;
    the clamped portion is clamped between an outer peripheral surface of the inside clamp portion and an inner peripheral surface of the outside clamp portion while the clamped portion is extended in the forward winding direction along the inner peripheral surface of the outside clamp portion, and
    one of the first separator and the second separator is extended along in contact with the outer peripheral surface of the outside clamp portion.

2. The winding type battery according to claim 1, wherein the outside clamp portion of the center pin is designed so that at least an end portion located forward in the forward winding direction has a tapered shape that is gradually thinner in thickness forward in the forward winding direction.

3. The winding type battery according to claim 1, wherein the center pin is elastically deformable in a direction perpendicular to the axial line.

4. The winding type battery according to claim 3, wherein the center pin is constituted of a plate material wound in a spiral shape beyond one turn about the axial line.

5. A method for manufacturing a winding type battery comprising:
    a center pin having a shape that extends along an axial line; and
    a wound power generation element in which a strip-shaped positive electrode plate and a strip-shaped negative electrode plate are wound in an overlapping state so that a strip-shaped first separator longer than the positive electrode plate and the negative electrode plate is interposed in one interspace between the positive electrode plate and the negative electrode plate and a strip-shaped second separator longer than the positive electrode plate and the negative electrode plate is interposed in another interspace between the positive electrode plate and the negative electrode plate,
    at least one of the first separator and the second separator being fixed to the center pin and wound from a start end side around the center pin in one direction,
    wherein when a circumferential direction around the axial line, in which winding of the wound power generation element advances, is referred to as a forward winding direction,
    the center pin includes
        an inside clamp portion; and
        a plate-like outside clamp portion located radially outward of the axial line than the inside clamp portion;
    the method comprises:
        a clamping step of clamping a clamped portion of at least one of the first separator and the second separator between an outer peripheral surface of the inside clamp portion and an inner peripheral surface of the outside clamp portion of the center pin and along the inner peripheral surface of the outside clamp portion while maintaining a shape extending in the forward winding direction; and
        a winding step of winding the first separator, the second separator, the positive electrode plate, and the negative electrode plate around the center pin so that one of the first separator and the second separator wound in the forward winding direction is in contact with the outer peripheral surface of the outside clamp portion of the center pin.

6. The method for manufacturing a winding type battery according to claim 5, wherein
    the outside clamp portion of the center pin is designed so that at least an end portion located forward in the forward winding direction has a tapered shape that is gradually thinner in thickness forward in the forward winding direction.

7. The winding type battery according to claim 2, wherein the center pin is elastically deformable in a direction perpendicular to the axial line.

* * * * *